May 30, 1967

H. PEDERSEN 3,321,840

APPARATUS FOR MEASURING SURFACE FINISH OF PINION
TOOTH AND LIKE CURVED SURFACES

Filed Dec. 27, 1965

United States Patent Office 3,321,840
Patented May 30, 1967

3,321,840
APPARATUS FOR MEASURING SURFACE FINISH OF PINION TOOTH AND LIKE CURVED SURFACES
Harry Pedersen, Rochester, N.Y., assignor to The Gleason Works, Rochester, N.Y., a corporation of New York
Filed Dec. 27, 1965, Ser. No. 516,409
12 Claims. (Cl. 33—179.5)

The present invention relates to apparatus for measuring and recording the surface finish of pinion tooth and like curved surfaces, i.e. the waviness or irregularities of such surfaces as distinguished from their general or overall curvature.

It has been known heretofore to provide apparatus by which a stylus may be traversed across a test surface and its displacements in a direction perpendicular to the surface recorded on a greatly magnified scale, while its displacement in the traverse direction is recorded on a scale that is enlarged only slightly or not at all. The stylus has been a part of a transducer whose electrical output is amplified to the degree desired and then fed to the recording device. While such apparatus has proven satisfactory for measuring the surface finish of flat or only very slightly curved surfaces, it has not been suitable for measuring sharply curved surfaces such as the tooth surfaces of automotive axle drive pinions and other gears, for the reason that the displacements of the stylus, due to the general or overall tooth curvature is so great, relative to the displacement caused by surface waviness or irregularity, that the latter is obscured on the magnified record. In fact with the degree of magnification desired for measuring surface finish, the tooth curvature is often so great as to move the pen or stylus of the recording device off the chart or record surface.

An object of the present invention is an apparatus by which a transducer is guided in a smooth curve corresponding closely to the overall profile curvature of a pinion tooth or like surface being measured, whereby the record of displacements of the stylus of the transducer constitutes a comparison of such surface with a smooth curve of the same general shape. Because the profile curve of a pinion tooth is usually a true or modified involute or octoid, this object requires an apparatus which is adapted to guide the transducer in a path of continually varying curvature.

An apparatus according to the invention comprises a support for the test part, a transducer having a stylus for following a surface of the part, a carrying slide for the transducer reciprocable relative to the support to traverse the stylus across a curved profile of said surface, a sled having a spherical rider slidable on a flat on the support that is substantially parallel to the path of slide reciprocation, said rider enabling the sled to rock on the flat about an axis extending through its sphere center and perpendicular to the path of slide reciprocation, the sled having the transducer mounted thereon and having connected thereto guidance means which act between the support and sled to rock the latter in such relation to the motion of the slide that the transducer is guided in a path which is a smooth curve of varying curvature which corresponds approximately to the profile curvature of the test part, and means connecting the sled to the slide for reciprocation therewith.

A preferred embodiment of the invention is shown in the accompanying drawings, wherein.

Figure 1:
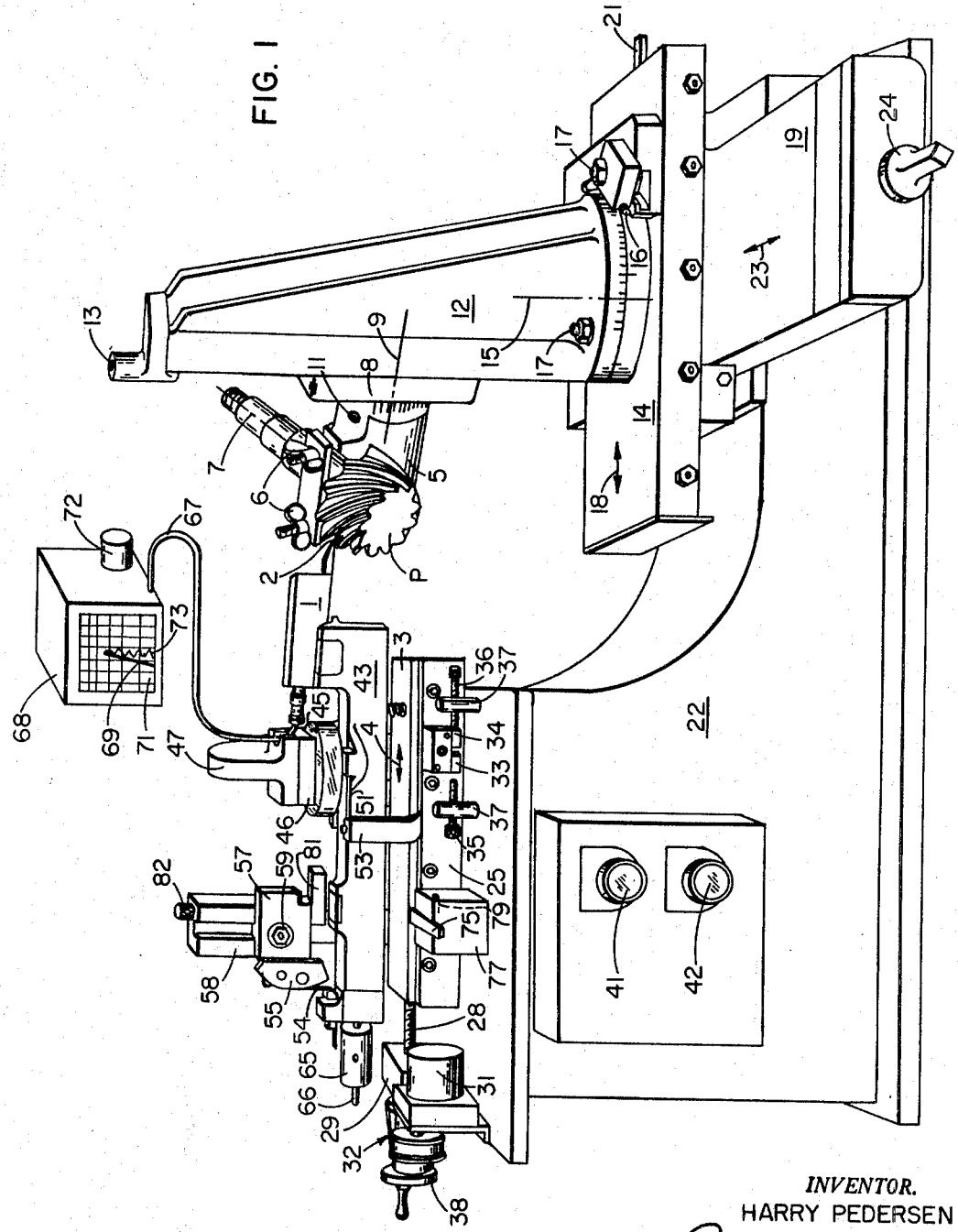
FIG. 1 is a perspective view of substantially the entire apparatus.
Figure 2:
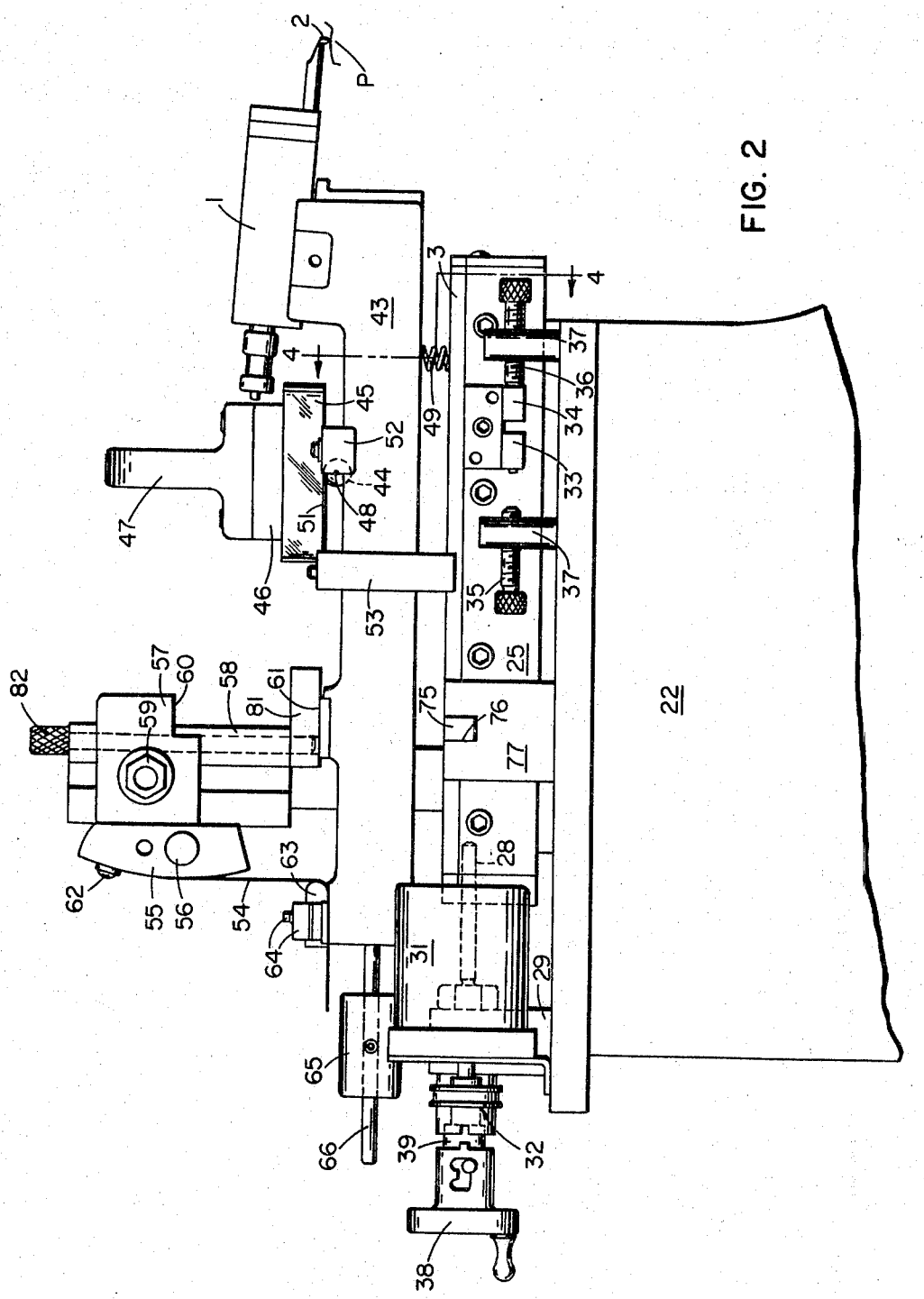
FIGS. 2 and 3 are respectively front and plan views of the transducer supporting and actuating portion of the apparatus; and, FIG. 4 is a vertical sectional view in planes 4—4 of FIG. 2.
Figure 3:
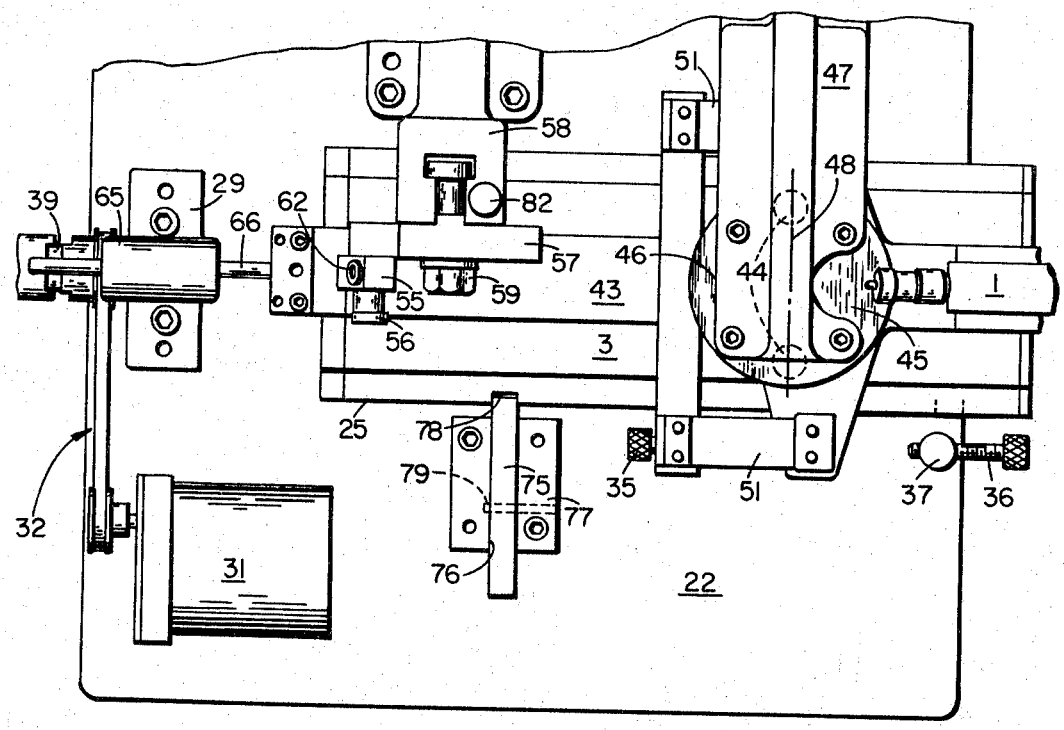

Referring to FIG. 1, transducer 1 has a probe 2 for contact under light spring pressure with a tooth surface of the test part, in this instance spiral bevel pinion P. The transducer is carried by a slide 3 which is reciprocable horizontally in the direction of arrow 4, to traverse the probe 2 across the tooth surface. The pinion support in adjustable so that the probe will follow the desired line across the tooth surface and that this line, although curved, will be nearly horizontal, so that the probe will be substantially at the same level at both ends of it traverse.

To provide for pinion adjustment, the shank of the pinion is clamped to a bracket 5 by means including wing nuts 6, which, when loosened, permit the pinion to be turned about its own axis 7. Bracket 5 is adjustable on a slide 8 about a horizontal axis 9 perpendicular to the pinion axis, and may then be clamped to the slide by means of a set screw 11. The slide is adjustable vertically on its support, column 12, by means of a vertical screw whose upper end 13 has a wrench socket. Column 12 is adjustable on a slide 14 about vertical axis 15 by means of a wrench-operated worm 16 which meshes with a worm wheel sector (not shown) on the column. After such adjustment the column is secured by threaded fasteners 17. Slide 14 is adjustable horizontally in the direction of arrow 18, parallel to direction 4, on a horizontal crossslide 19, by means of a screw 21. The cross slide is adjustable on frame 22 by means of screw 24, this adjustment being in the direction of arrow 23, perpendicular to 18. These adjustments are readily made by trial. However scales are preferably provided on the adjusting parts to enable duplication of the adjustments, as for example when pinions of the same design are to be tested at different times.

Figure 4:
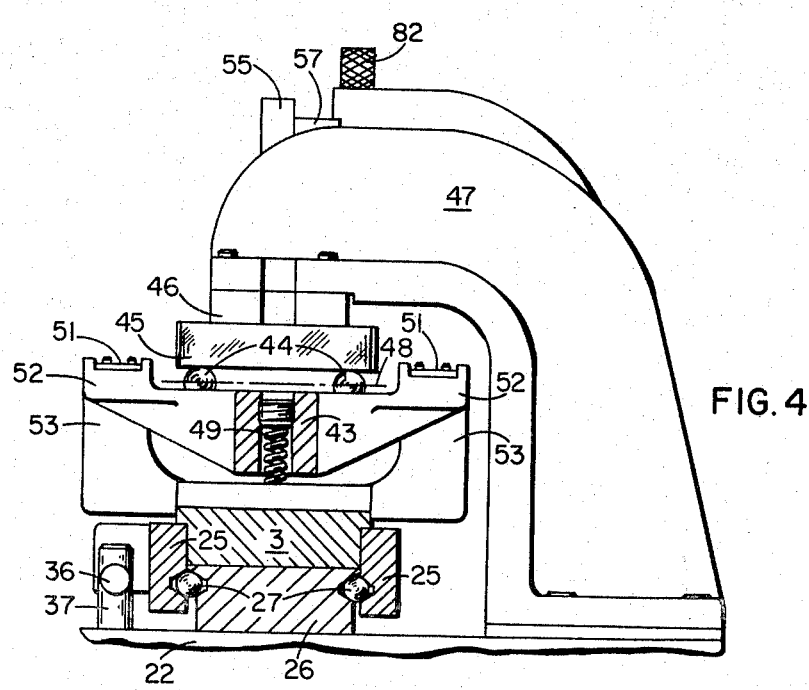

Slide 3 includes bearing rails 25 supported for reciprocation on horizontal guide 26 of frame 22 on ball gearings 27, FIG. 4. Reciprocation is effected by a screw 28 that is threaded to the slide 3 and is journaled for rotation in a bolster 29 on the frame. The screw is driven by a reversible electric motor 31 through belt-and-pulley drive 32. Reversal of the motor is effected by limit switches 33 and 34 carried by the slide and actuated by abutment against stop screws 35 and 36 that are threaded to posts 37 on the frame. When, during motion of the slide to the left in FIG. 1, the switch 33 abuts screw 35 the motor 31 is reversed to drive the slide to the right, and when switch 34 abuts screw 36 the motor is again reversed to drive the slide to the left. A handwheel 38, connectible to screw 28 by clutch means 39, may be used to actuate the slide manually, for example while the screws 35, 36 are being adjusted to provide the stroke of slide 3 that is necessary to traverse the probe 2 across the tooth surface of the particular pinion P under test. The motor is also subject to control by start switch 41 and stop switch 42.

The transducer 1 is rigidly mounted upon one end of a sled 43 which has secured thereto two accurately ground spherical riders 44 bearing upon an optical flat 45. This flat is attached to a support member 46 that is rigidly connected to frame 22 by an arm 47. The flat is parallel to the path of reciprocation of slide 3 determined by elements 25–27 and is also parallel to an axis 48 that extends through the sphere centers and is perpendicular to the slide reciprocation path. A coil spring 49, arranged to act vertically between the slide and sled, maintains the riders against the flat. The arrangement is such that the sled can slide along the flat and also rock thereon about axis 48. Thin cantilever leaf springs or reeds 51, horizontally disposed, are connected at one end to arms 52 projecting from opposite sides of the sled and at the opposite end to arms 53 extending from opposite sides of slide 3. These reeds serve to connect the sled to the slide for the horizontal reciprocation effected by motor 31 and screw 28, yet allow relatively free vertical motion and rocking motion of the sled.

For rocking the sled about axis 48, in such relation to linear motion of the sled that the transducer 1 will move through a curved path of varying curvature (corresponding at least approximately to the curved profile of the test part being traversed by probe 2), the end of the sled opposite to the transducer is connected by a thin flexible band 54 to a cylindrical sector 55 rigid with frame 22. The sector is secured by screw 56 to a slide 57 that is vertically adjustable upon a standard 58 rigid with frame 22. After adjustment the slide is secured to the standard by a screw 59. The upper end of band 54 extends in wrapped relation around the sector 55 and is anchored thereto by a fastener 62. The lower end of the band extends in wrapped relation around the semi-cylindrical nose of a member 63 and also under this member. Fastening means 64 draw member 63 against the sled, thereby clamping the lower end of the band 54 to the sled. The band is kept under constant tension by a weight 65 that is adjustable along a rod 66 which projects from the end of the sled that is adjacent anchorage 63, 64. The span or free length of the band 54, between sector 55 and member 63, may be measured by gage blocks placed between surface 60 of slide 57 and surface 61 of sled 43.

The transducer is electrically connected by flexible cable 67 to an amplifying and recording unit 68 which has a pen 69 for recording on a chart 71, on a greatly magnified scale, the displacements of the probe 2 relative to the body of transducer 1. The unit 68 includes a chart drive motor 72 so connected electrically with the motor 31 that the two motors operate in at least approximately constant speed ratio, whereby the motion of the chart beneath the pen 69, in a direction perpendicular to the pen's displacements, is at least approximately proportional to the motion 4 of the slide. In the illustrated unit the chart is moved vertically upwards by motor 72 and displacements of the pen are horizontal. The construction and operation of the transducer and unit 68 are well known, as are also the means for calibrating the unit to the desired scale of magnification, and hence are not themselves parts of the present invention.

Inasmuch as the radius of the semi-cylindrical surface of member 63 is very small compared to that of sector 55, the portion of the band tangent to member 63 describes a curve of involute-like form as the sled and slide move back and forth. The axis 48, the tip of probe 2, and the tangent line of band 54 on member 63, lie nearly in a plane, and the probe and this tangent line are approximately equidistant from axis 48, so that the probe if not displaced by the tooth surface would follow a similar curve of constantly changing radius. The mean radius of this curve can be varied by adjusting the span of band 54 between members 55 and 63, this being readily accomplished by loosening the fastening means 64 and adjusting slide 57 vertically. The portion of the band that is tangent to members 55 and 63 is maintained vertical during adjustment of the apparatus by means of a lever 75 which fits in slot 76 in a block 77 secured to the frame and in a notch 78 in front rail 25. This lever is pivoted to block 77 by a pin 79, and is swung clear of notch 78 after the adjustment is made. Similarly a block 81 pivoted and secured to slide 58 by screw 82, may be swung laterally to overlie surface 61 during adjustment of the apparatus. The parts are so proportioned that the tip of stylus 2 and the line of tangency of band 54 with the nose of member 63 lie in the same horizontal plane when surface 61 is held against block 81. The band 54 is adjusted while surface 61 is in this position.

The rate of change in radius of curvature of the path of the transducer is readily varied by replacing the sector 55 with a sector of larger or smaller radius. With the freedom to adjust the mean radius and the rate of change of radius of the path of the transducer, the freedom to select the direction of traverse across the pinion, by adjustment of the latter, a very close match can be made between the curve traversed by the transducer and the tooth profile curvature. Accordingly with proper adjustment of the apparatus the mean direction of the line 73 drawn by the pen on the chart during each traverse will be straight or nearly straight, which greatly facilitates accurate measurement of the irregularities of the line attributable to waviness or other imperfections of the tooth surface.

Having now described my invention and the manner of its use, what I claim is:

1. A measuring apparatus for gear tooth and like curved surfaces, comprising a support for a test part, a transducer having a stylus for following a surface of the part, a carrying slide for the transducer reciprocable relative to the support to traverse the stylus across a curved profile of said surface, a sled connected to said slide for reciprocation therewith, a flat on said support disposed in a plane parallel to the path of slide reciprocation, a spherical rider on said sled and bearing upon said flat for sliding thereon and also for rocking thereon about an axis extending through the center of said spherical rider non-perpendicularly to the flat and transversely of the path of slide reciprocation, the sled having the transducer mounted thereon and having connected thereto guidance means which act between the support and sled to rock the latter relative to the slide in such relation to the slide reciprocation that the transducer is guided in a path which is a smooth curve of varying curvature which corresponds approximately to the profile curvature of the test part.

2. An apparatus according to claim 1 in which the transducer is electrically connected with a recorder having a movable recording element, and there are coordinated means for driving said slide and said recording element, whereby throughout a stroke of the slide a record may be made of departures of the actual path of the stylus, determined by its contact with the test surface, from the path in which the transducer is guided by the slide and said guidance means.

3. An apparatus according to claim 1 in which the sled has two of said spherical riders slidable on said flat, both riders having their sphere centers on said axis.

4. An apparatus according to claim 2 in which said transducer is spaced from said guidance means in the direction of slide reciprocation and said axis is disposed substantially midway between the contact point of stylus of the transducer and the point of connection of the guidance means to the sled.

5. An apparatus according to claim 1 in which the guidance means include a flexible band and anchorages therefor respectively on the sled and the support, said band being secured in wrapped relation onto oppositely curved surfaces of said anchorages and extending tangentially between said surfaces, whereby upon each stroke of the slide the ends of the sled traverse curved paths of varying radius.

6. An apparatus according to claim 5 in which said curved surfaces of said anchorages are of constant radius in a plane perpendicular to said axis, one of said curved surfaces being of substantially greater radius than the other.

7. An apparatus according to claim 6 in which said stylus and the tangentially extending portion of the band are approximately equidistant from said axis.

8. An apparatus according to claim 7 in which the anchorage of larger radius is replaceable and is adjustable on the support in a direction perpendicular to said flat.

9. An apparatus according to claim 7 in which said axis is so closely spaced to a straight line between the contact point of the stylus and the tangent point of the band with the anchorage on the sled that upon reciprocation of the slide the paths of said points are substantially similar.

10. An apparatus according to claim 5 in which the connection between said sled and said slide includes a pair of cantilever leaf springs which extend between the slide and the sled substantially in the direction of slide reciprocation and whose wider faces are approximately parallel to said flat.

11. A device according to claim 10 further including a weight, adjacent the end of the sled having said anchorage, for maintaining said band under tension, and a spring effective between the slide and the sled for maintaining the riders against said flat.

12. A device according to claim 10 in which the points of connection of said leaf springs to the sled are adjacent said axis, and there is a compression spring acting against the sled, at a point between said axis and said transducer, to maintain said riders against said flat.

References Cited
UNITED STATES PATENTS

| | | | |
|---|---|---|---|
| 1,564,589 | 12/1925 | Laessker | 33—179.55 |
| 2,590,203 | 3/1952 | Petit | 33—179.55 |
| 2,652,665 | 9/1953 | Jessup et al. | 33—179.55 X |
| 2,895,227 | 7/1959 | Wagner et al. | 33—179.55 |
| 3,270,425 | 9/1966 | Tishler et al. | 33—179.55 |

LEONARD FORMAN, *Primary Examiner.*

SAMUEL S. MATTHEWS, *Assistant Examiner.*